(12) United States Patent
Lee

(10) Patent No.: US 8,204,551 B2
(45) Date of Patent: Jun. 19, 2012

(54) ATTACHABLE BATTERY PACK FOR INTELLIGENT CELL PHONE

(76) Inventor: Chih Hsing Lee, Taipei County (TW)

( * ) Notice: Subject to any disclaimer, the term of this patent is extended or adjusted under 35 U.S.C. 154(b) by 66 days.

(21) Appl. No.: 12/907,195

(22) Filed: Oct. 19, 2010

(65) Prior Publication Data

US 2012/0094728 A1    Apr. 19, 2012

(51) Int. Cl.
*H04B 1/38* (2006.01)
(52) U.S. Cl. ........ 455/572; 320/112; 320/113; 320/114; 320/115; 455/573; 455/575.1; 455/578.8
(58) Field of Classification Search ............... 455/550.1, 455/571–573, 575.1, 575.3, 575.8; 320/112–115; 340/636.1, 693.1, 693.2, 693.5, 693.7
See application file for complete search history.

(56) References Cited

U.S. PATENT DOCUMENTS

| | | | | |
|---|---|---|---|---|
| 2002/0039016 | A1* | 4/2002 | You et al. | 320/115 |
| 2005/0090301 | A1* | 4/2005 | Lange et al. | 455/575.8 |
| 2006/0058073 | A1* | 3/2006 | Kim | 455/573 |
| 2007/0037551 | A1* | 2/2007 | Piekarz | 455/406 |
| 2009/0117953 | A1* | 5/2009 | Oh | 455/575.1 |
| 2009/0278490 | A1* | 11/2009 | Idzik et al. | 320/103 |
| 2010/0317412 | A1* | 12/2010 | Tan | 455/573 |

* cited by examiner

*Primary Examiner* — Kent Chang
*Assistant Examiner* — Dinh P Nguyen
(74) *Attorney, Agent, or Firm* — Rosenberg, Klein & Lee

(57) ABSTRACT

An attachable battery pack having a battery body with a pivoted clamp for detachably fastening to one end of an intelligent cell phone (iPhone or Google phone) as a spare battery. The battery body is configured to overlay the display screen of the intelligent cell phone to provide protection for the display screen and includes a charging circuit and connector for charging the built-in battery of the intelligent cell phone.

1 Claim, 4 Drawing Sheets

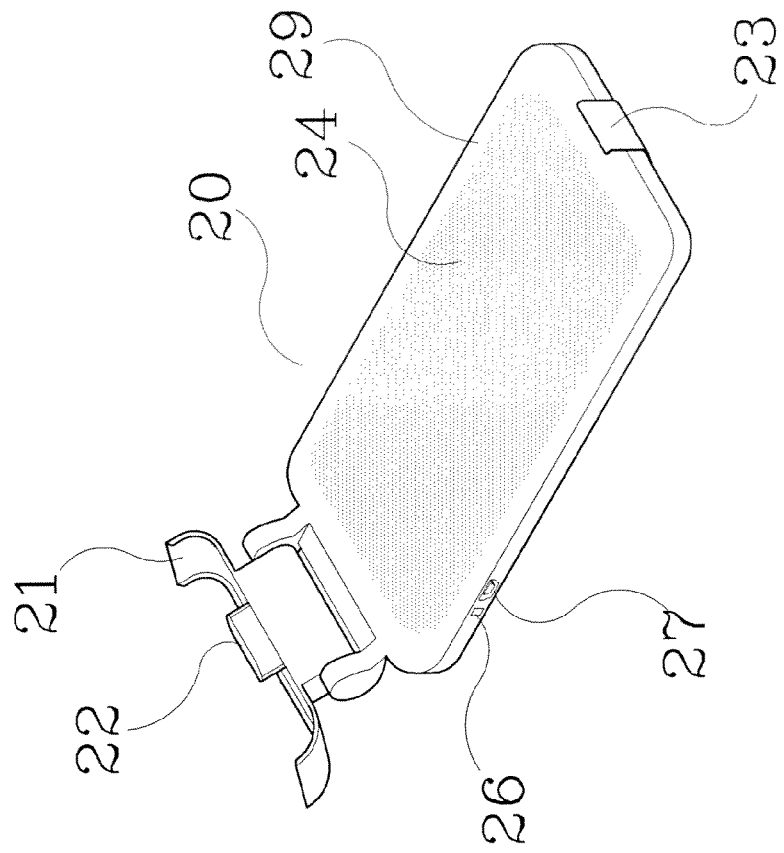
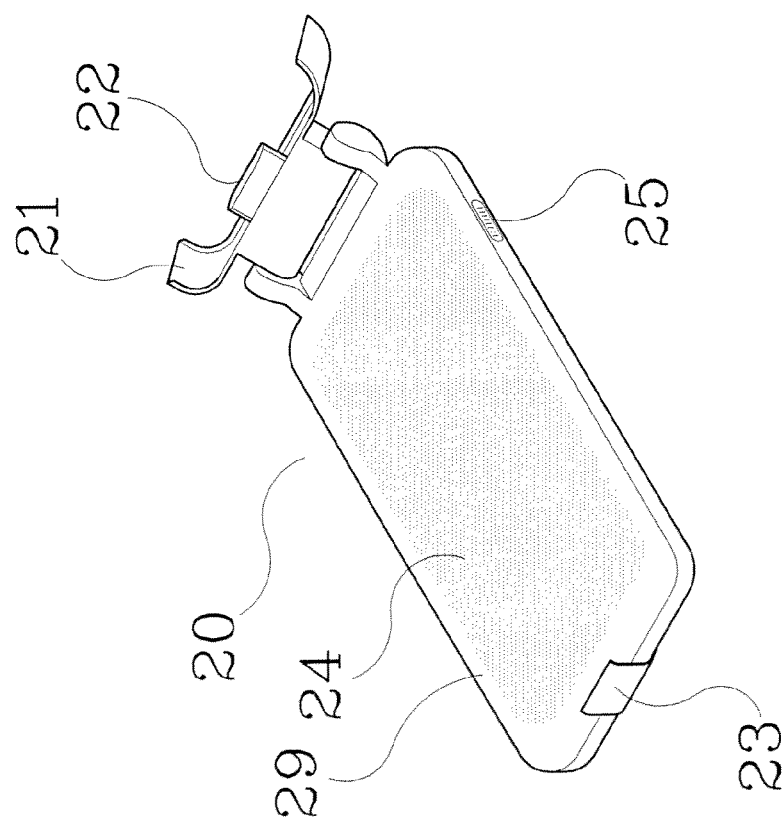

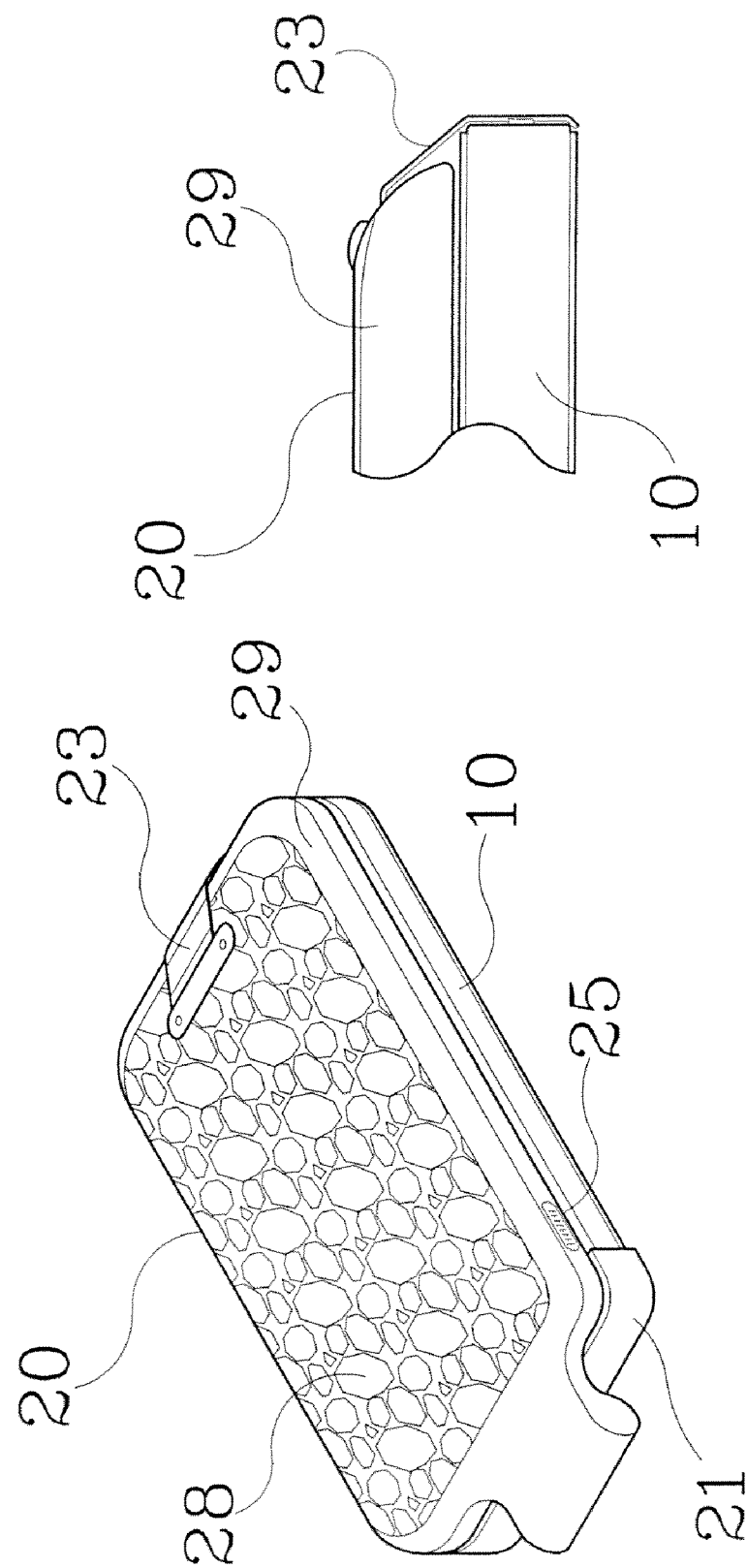

ATTACHABLE BATTERY PACK FOR INTELLIGENT CELL PHONE

BACKGROUND OF THE INVENTION

1. Field of the Invention

The present invention relates to battery packs and more particularly, to an attachable battery pack detachably connectable to an intelligent cell phone (such as, iPhone or Google phone) for use as a spare battery and screen protector.

2. Description of the Related Art

Regular cell phones allow replacement of the rechargeable battery. However, certain single-piece commercial intelligent cell phones (such as, APPLE-iPhone or Google phone) do not allow replacement of the built-in rechargeable battery. When it is necessary to repair or replace the built-in rechargeable battery of an intelligent cell phone of this kind, the user must send to the intelligent cell phone to the distributor for repair or replacement by a technician. Further, when the power of the built-in rechargeable battery of an intelligent cell phone of this kind is used up and no any external power source is available, the intelligent cell phone becomes operable. Further, due to a single piece design, the screen of an intelligent cell phone of this kind tends to be scratched accidentally.

SUMMARY OF THE INVENTION

The present invention has been accomplished under the circumstances in view. It is one object of the present invention to provide an attachable battery pack, which is attachable to an intelligent cell phone for use as a spare battery. It is another object of the present invention to provide an attachable battery pack, which is attachable to an intelligent cell phone for screen protection.

To achieve these and other objects of the present invention, an attachable battery pack comprises a body having a static flocking fabric cover face on its one side and a genuine leather covering on its other side, a clamp pivotally connected to one end of the body for detachably fastening to an intelligent cell phone for enabling the body to be closed on the screen of the intelligent cell phone or opened from the intelligent cell phone, an electrical connector, which is connected to the power jack of the intelligent cell phone after clamping of the clamp on one end of the intelligent cell phone, a power switch for charging control and an indicator light for charging indication.

BRIEF DESCRIPTION OF THE DRAWINGS

FIG. 2 is an oblique elevation of an attachable battery pack in accordance with the present invention.

FIG. 3 corresponds to FIG. 2 when viewed from another angle.

FIG. 5 corresponds to FIG. 5, illustrating the attachable battery pack closed on the intelligent cell phone.

FIG. 6 is a schematic sectional view of a part of FIG. 5.

DETAILED DESCRIPTION OF THE PREFERRED EMBODIMENT

Figure 1:
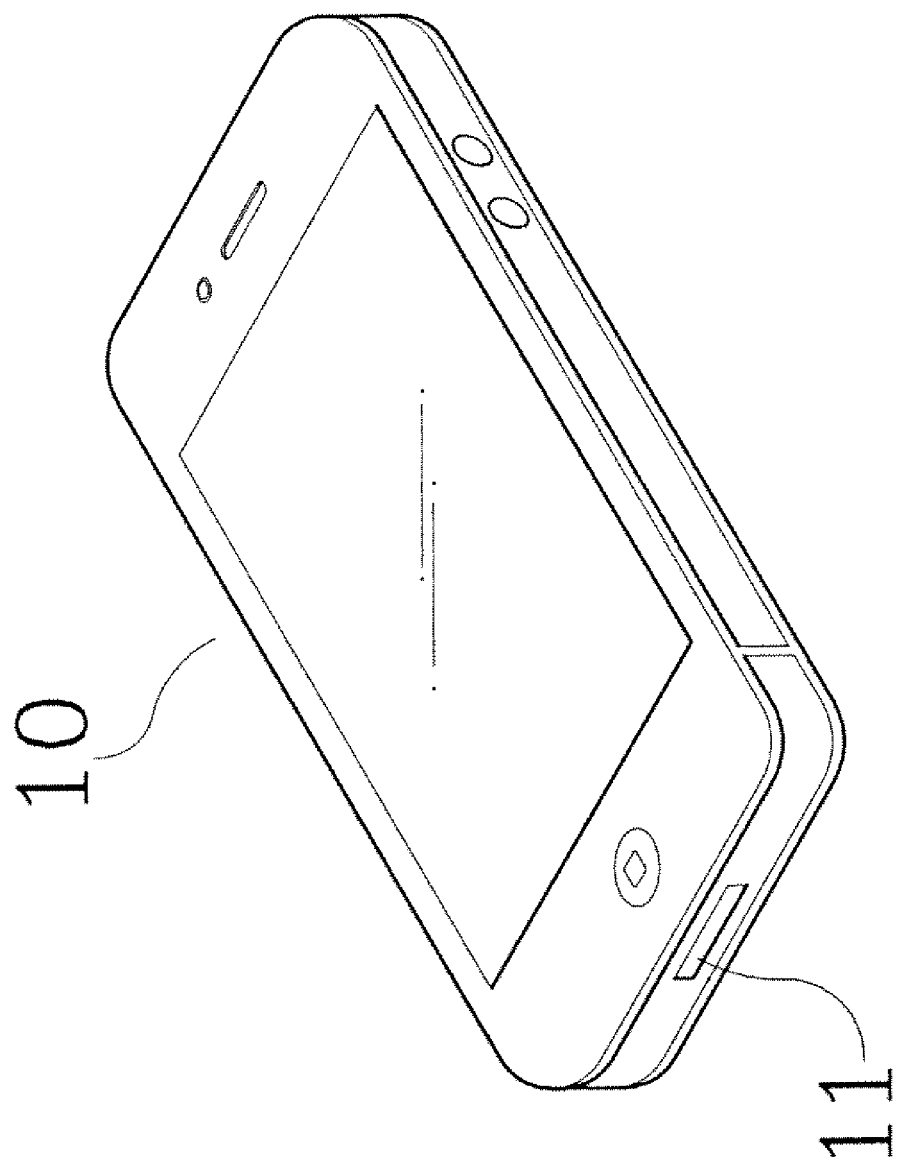
FIG. 1 is an elevational view of a commercial intelligent cell phone.

Referring to FIG. 1, an intelligent cell phone 10 (for example, APPLE-iPhone) is a single-piece member having a built-in rechargeable battery (not shown) that is not detachable and a power jack 11 located on one side thereof (for example, the bottom side) for the connection of a charging cable to charge the built-in rechargeable battery with an external power source.

Referring to FIGS. 2 and 3, an attachable battery pack 20 is shown attachable to an intelligent cell phone 10. The attachable battery pack 20 comprises a flat body 29 configured for use as a screen cover for the intelligent cell phone 10. The body 29 has built therein a high-quality, charging and discharging Li-polymer battery cell and a charging circuit (this arrangement is of the known art and not within the scope of the invention), a static flocking fabric cover face 24 covered over the inner side thereof (the side to be covered on the screen of the intelligent cell phone 10) by means of static flocking technology for protecting the screen of the intelligent cell phone 10, a genuine leather covering 28 covered over the outer side thereof (see FIG. 5) to exhibit an image of noble and high level.

The attachable battery pack 20 further comprises a clamp 21 pivotally connected to one end of the body 29, an electrical connector 22 located on the clamp 21 and electrically connected to the Li-polymer battery cell and the charging circuit in the body 29, and a springy hook 23 extended from the other end of the body 29.

The attachable battery pack 20 further comprises a power switch 25 located on one lateral side of the body 29, a power jack 27 and an indicator light 26 located on the other lateral side of the body 29. The power jack 27 is configured subject to the specification of the power jack 11 of the intelligent cell phone 10. The indicator light 26 is for visual charging indication.

Figure 4:
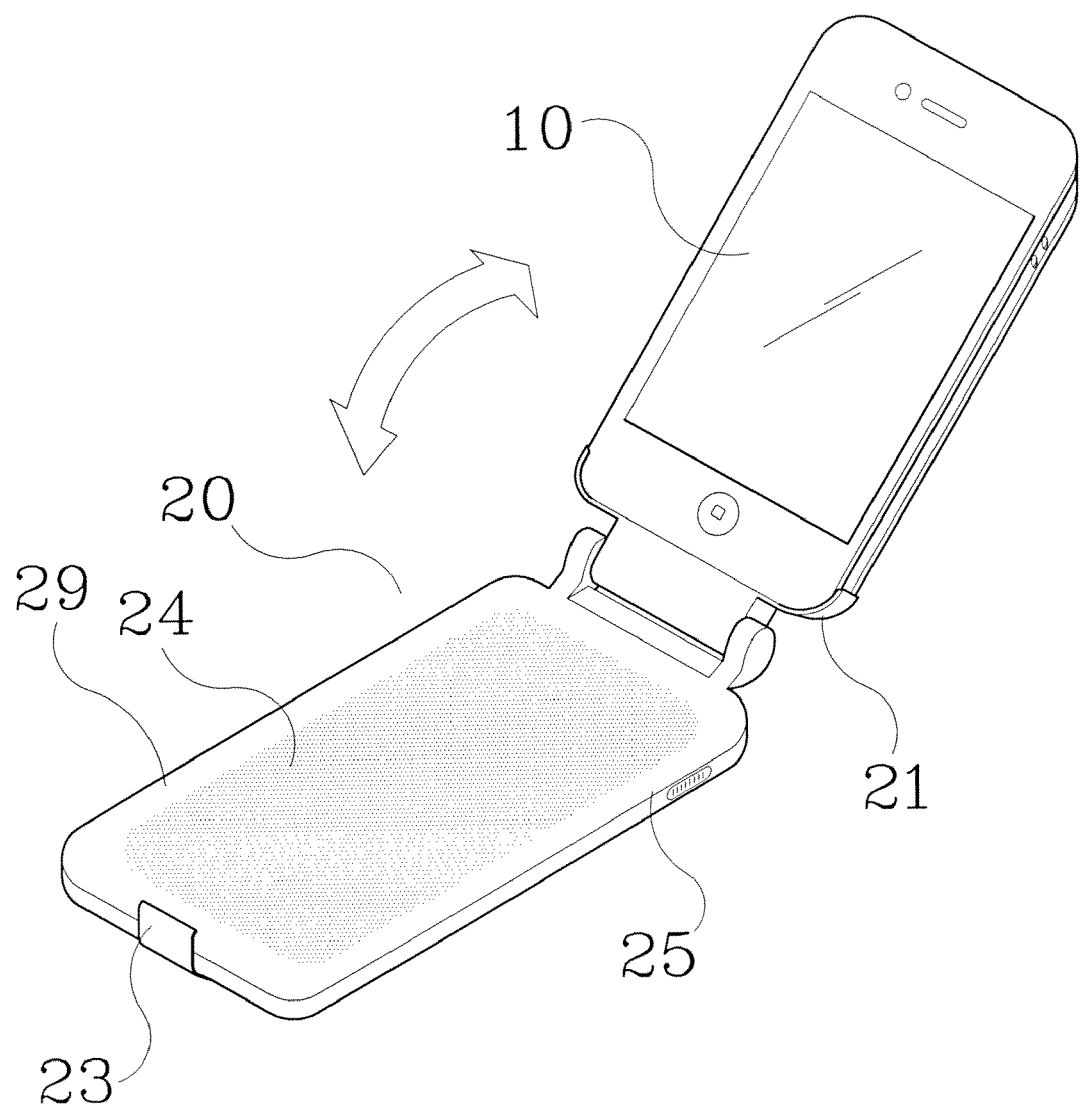
FIG. 4 is a schematic drawing of the present invention, illustrating the attachable battery pack attached to an intelligent cell phone.

Referring to FIGS. 4 and 5, when using the intelligent cell phone 10 with the attachable battery pack 20, attach the attachable battery pack 20 to the intelligent cell phone 10 by clamping the clamp 21 to one end of the intelligent cell phone 10 and electrically connecting the electrical connector 22 to the power jack 11 of the intelligent cell phone 10. After connection of the clamp 21 to one end of the intelligent cell phone 10, the user can bias the body 29 relative to the intelligent cell phone 10 between a close position (see FIGS. 5 and 6) where the springy hook 23 is hooked on the other end of the intelligent cell phone 10 and the body 29 is covered on the screen of the intelligent cell phone 10 and an open position (see FIG. 4) where the springy hook 23 is disengaged from the intelligent cell phone 10 for enabling the user to operate the intelligent cell phone 10.

Further, the user can switch on/off the power switch 25. When the power switch 25 is in the "ON" position, the built-in rechargeable battery of the intelligent cell phone 10 is charged with the attachable battery pack 20 or an external power source that is electrically connected to the power jack 27, and at the same time the indicator light 26 is turned on to give a visual indication signal. When the power switch 25 is in the "OFF" position, the attachable battery pack 20 is electrically disconnected from the intelligent cell phone 10.

Further, the user can use the mating charging cable (or battery charger) of the intelligent cell phone 10 and electrically connect the mating charging cable (or battery charger) to the power jack 27 of the body 29 to charge the Li-polymer battery cell of the body 29 of the attachable battery pack 20 with AC power supply (city power supply). During charging, the indicator light 26 is turned on to give a visual indication signal.

Further, it is to be understood that the attachable battery pack 20 can be selectively configured to fit the length, width and thickness of any of a variety of commercial intelligent cell phones.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An attachable battery pack, comprising a body configured to fit the screen of an intelligent cell phone and carrying therein a Li-polymer battery cell and a charging circuit, said body having opposing front and back side and opposing first and second ends, a static flocking fabric covering at said front side, a genuine leather covering at said back side and a springy hook extended from said first end;

a clamp pivotally connected to the second end of said body and adapted for clamping to one end of an intelligent cell phone for enabling said body to be biased relative to the intelligent cell phone between an open position where said body is kept away from the intelligent cell phone and a close position where said spring hook of said body is hooked on an opposite end of the intelligent cell phone;

an electrical connector fixedly located on said clamp and electrically connected said Li-polymer battery cell and said charging circuit of said body;

a power switch located on one of two opposing lateral sides of said body and operable to switch on/off electric connection between said electrical connector and said Li-polymer battery cell and said charging circuit of said body;

a power jack located on one of the two opposing lateral sides of said body for the connection of a charging cable to charge said Li-polymer battery cell of said body with an external power source; and an indicator light located on one of the two opposing lateral sides of said body and adapted for giving off light when said power switch is switched on.

\* \* \* \* \*